(12) United States Patent
Stensmo

(10) Patent No.: US 6,925,433 B2
(45) Date of Patent: Aug. 2, 2005

(54) SYSTEM AND METHOD FOR CONTEXT-DEPENDENT PROBABILISTIC MODELING OF WORDS AND DOCUMENTS

(75) Inventor: Jan Magnus Stensmo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 736 days.

(21) Appl. No.: 09/851,675

(22) Filed: May 9, 2001

(65) Prior Publication Data

US 2002/0194158 A1 Dec. 19, 2002

(51) Int. Cl.$^7$ .......................... G06F 17/27; G06F 7/00; G06F 17/30
(52) U.S. Cl. .................................. 704/9; 707/3; 707/6
(58) Field of Search .................. 707/6, 3; 704/10, 704/1, 9; 715/532

(56) References Cited

U.S. PATENT DOCUMENTS

| | | | |
|---|---|---|---|
| 4,905,287 A | 2/1990 | Segawa | 381/43 |
| 5,023,912 A | 6/1991 | Segawa | 381/43 |
| 5,325,298 A * | 6/1994 | Gallant | 704/9 |

(Continued)

FOREIGN PATENT DOCUMENTS

| | | |
|---|---|---|
| EP | 0241183 A1 | 10/1987 |
| EP | 0539749 A2 | 5/1993 |
| JP | 11338883 A | 12/1999 |
| WO | WO 97/46998 | 12/1997 |

OTHER PUBLICATIONS

Shavlik et al., "An Instructable, adaptive interface for discovering and monitoring information on the World–Wide Web", Proceedings of the 4th international conference on Intelligent user interfaces, Los Angeles, California, 1998, pp: 157–160.*

(Continued)

*Primary Examiner*—Talivaldis Ivars Smits
*Assistant Examiner*—Brian Albertalli
(74) *Attorney, Agent, or Firm*—John L. Rogitz

(57) ABSTRACT

A computer-implemented system and method is disclosed for retrieving documents using context-dependant probabilistic modeling of words and documents. The present invention uses multiple overlapping vectors to represent each document. Each vector is centered on each of the words in the document, and consists of the local environment, i.e., the words that occur close to this word. The vectors are used to build probability models that are used for predictions. In one aspect of the invention a method of context-dependant probabilistic modeling of documents is provided wherein the text of one or more documents are input into the system, each document including human readable words. Context windows are then created around each word in each document. A statistical evaluation of the characteristics of each window is then generated, where the results of the statistical evaluation are not a function of the order of the appearance of words within each window. The statistical evaluation includes the counting of the occurrences of particular words and particular documents and the tabulation of the totals of the counts. The results of the statistical evaluation for each window are then combined. These results are then used for retrieving a document, for extracting features from a document, or for finding a word within a document based on its resulting statistics.

27 Claims, 4 Drawing Sheets

U.S. PATENT DOCUMENTS

| | | | | |
|---|---|---|---|---|
| 5,434,777 A | * | 7/1995 | Luciw | 704/9 |
| 5,488,725 A | * | 1/1996 | Turtle et al. | 707/5 |
| 5,619,709 A | * | 4/1997 | Caid et al. | 715/532 |
| 5,675,819 A | * | 10/1997 | Schuetze | 704/10 |
| 5,713,016 A | * | 1/1998 | Hill | 707/5 |
| 5,778,397 A | | 7/1998 | Kupiec et al. | 707/500 |
| 5,809,496 A | | 9/1998 | Byrd, Jr. et al. | 707/5 |
| 5,913,185 A | * | 6/1999 | Martino et al. | 704/8 |
| 5,918,240 A | | 6/1999 | Kupiec et al. | 707/531 |
| 6,070,133 A | * | 5/2000 | Brewster et al. | 704/9 |
| 6,192,360 B1 | * | 2/2001 | Dumais et al. | 707/6 |
| 6,256,629 B1 | * | 7/2001 | Sproat et al. | 707/6 |
| 6,741,981 B2 | * | 5/2004 | McGreevy | 707/3 |
| 6,772,120 B1 | * | 8/2004 | Moreno et al. | 704/256 |

OTHER PUBLICATIONS

Lewis et al., "A sequential algorithm for training text classifiers", Proceedings of the 17th annual international ACM SIGIR conference on Research and development in information retrieval, Dublin, Ireland, 1994, pp: 3–12.*

Shavlik et al., "Intelligent Agents for Web–based Tasks: An Advice–Taking Approach", AAAI/ICML Workshop on Learning for Text Categorization, 1998.*

Pederson, "A simple approach to building ensembles of Naive Bayesian classifiers for word sense disambiguation", Proceedings of the first conference on North American chapter of the Association for Computational Linguistics, Seattle, Washington, 2000.*

* cited by examiner $$p(d|O) = p(d)\frac{p(O|d)}{p(O)} \qquad (1)$$

$$p(d|o_1,...,o_M) = p(d)\frac{p(o_1,...,o_M|d)}{p(o_1,...,o_M)}, \qquad (2)$$

$$p(o_1,...,o_M|d) = \prod_{i=1}^{M} p(o_i|d). \qquad (3)$$

$$p(d|o_1,...,o_M) = p(d)\frac{\prod_{i=1}^{M} p(o_i|d)}{p(o_1,...,o_M)}. \qquad (4)$$

$$p(d|o_1,...,o_M) \propto p(d)\prod_{i=1}^{M} p(o_i|d) \qquad (5)$$

$$\log p(d|o_1,...,o_M) \propto \log p(d) + \sum_{i=1}^{M} \log p(o_i|d) \qquad (6)$$

$$p(o_1,...,o_M) = \prod_{i=1}^{M} p(o_i) \qquad (7)$$

$$p(d|o_1,...,o_M) = p(d)\frac{\prod_{i=1}^{M} p(o_i|d)}{\prod_{i=1}^{M} p(o_i)} = p(d)\prod_{i=1}^{M} \frac{p(o_i|d)}{p(o_i)} \qquad (8)$$

$$M_{x,y} = \log \frac{p(x|y)}{p(x)} = \log \frac{p(y|x)}{p(y)} = \log \frac{p(x,y)}{p(x)p(y)}. \qquad (9)$$

$$\log p(d|o_1,...,o_M) = B_d + \sum_{i=1}^{M} M_{o_i,d} \qquad (10)$$

Figure 3A $$p(y) = \frac{c_y}{N} \qquad (11)$$

$$p(x,y) = \frac{c_{x,y}}{N} \qquad (12)$$

$$p(y|x) = \frac{c_{x,y}}{c_x} \qquad (13)$$

$$\frac{p(y|x)}{p(y)} = \frac{c_{x,y}N}{c_x c_y} \qquad (14)$$

$$p(y) = \frac{c_y+1}{N+U} \qquad (15)$$

$$p(x,y) = \frac{c_{x,y}+1}{N+U} \qquad (16)$$

$$p(y|x) = \frac{c_{x,y}+1}{c_x+1} \qquad (17)$$

$$\frac{p(y|x)}{p(y)} = \frac{(c_{x,y}+1)(N+U)}{(c_x+1)(c_y+1)} \qquad (18)$$

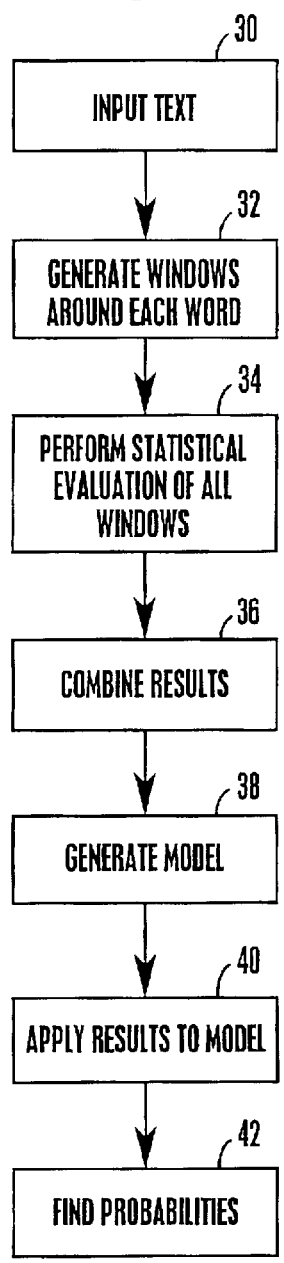

Fig. 5

Document 1: the quick brown fox slyly
Document 2: jumped over the lazy dog

Fig. 6

| Document | Center word | Window |
|---|---|---|
| 1 | the | the quick |
| 1 | quick | the brown fox |
| 1 | brown | the quick fox slyly |
| 1 | fox | quick brown slyly |
| 1 | slyly | brown fox |
| 2 | jumped | over the |
| 2 | over | jumped the lazy |
| 2 | the | jumped over lazy dog |
| 2 | lazy | over the dog |
| 2 | dog | the lazy |

Fig. 7

Single counters:

| | |
|---|---|
| 1 | 5 |
| 2 | 5 |
| the | 7 |
| quick | 3 |
| brown | 3 |
| fox | 3 |
| slyly | 2 |
| jumped | 2 |
| over | 3 |
| lazy | 3 |
| dog | 2 |

Total 28 (this is variable N)

Fig. 8

Pairs:

| | |
|---|---|
| 1-the | 3 |
| 1-quick | 3 |
| 1-brown | 3 |
| 1-fox | 3 |
| 1-slyly | 2 |
| 2-over | 3 |
| 2-the | 4 |
| 2-jumped | 2 |
| 2-lazy | 3 |
| 2-dog | 2 |

US 6,925,433 B2

SYSTEM AND METHOD FOR CONTEXT-DEPENDENT PROBABILISTIC MODELING OF WORDS AND DOCUMENTS

BACKGROUND OF THE INVENTION

1. Field of the Invention

The present invention relates generally to natural language processing, and more particularly to systems and methods for processing and retrieving natural language text using probabilistic modeling of words and documents.

2. Description of the Related Art

With the expanding use of the Internet there has been an increase in the number of people having access to large databases containing textual information. This has increased the need for systems for analyzing data in large databases to assist in the retrieval of desired information. The sheer size of the available databases makes it difficult to avoid retrieving extraneous information. Many typical text search and retrieval systems are top-down systems where the user formulates a search request but does not have access to the actual textual data so the user must guess at the proper request to obtain the desired data. One conventional top-down system for retrieving textual data is a keyword search system. In a keyword search query, the user enters one or more keywords and then a search of the data vase is conducted using the keywords. If the user knows the exact keywords that will retrieve the desired data, then the keyword search may provide useful results. However, most users do not know the exact keyword or combination of keywords that will produce the desired data. In addition, even though a specifically focused keyword may retrieve the desired data, they may also retrieve a large amount of extraneous data that happens to contain the keywords. The user must then sift through all of the extraneous data to find the desired data, which may be a time-consuming process.

Another problem with conventional keyword based searches is related to the inherent properties of the human language. A keyword selected by the user may not match the words within the text or may retrieve extraneous information for a couple of reasons. First, different people will likely choose different keywords to describe the same object. For example, one person may call a particular object a Abank@ while another person may call the same object a Asavings and loan@. Second, the same word may have more than one distinct meaning. In particular, the same word used in different contexts or when used by different people may have different meaning. For example, the keyword Abank@ may retrieve text about a riverbank or a savings bank when only articles about a saving bank are desirable, because the keyword does not convey information about the context of the word.

To overcome these and other problems in searching large databases considerable research has been done in the areas of Statistical Natural Language Processing, also referred to as Text Mining. This research has focused on the generation of simplified representations of documents. By simplifying document representation the ability to find desired information among a large number of documents is facilitated. One common simplification is to ignore the order of words within documents. This is often called a Abag of words@ representation. Each document is represented as a vector consisting of the words, regardless of the order of their occurrence. However, with this approach information relating to the context and meaning of the words due to their order is lost and the ability to discriminate desired information is sometimes lost.

Other models have been developed for modeling language that do take sequences of words into account. However, such models are quite specialized and can become quite complicated. Hence they are not very useful for general text mining.

Thus, there is a need for improved techniques to assist in searching large databases. To this end there is also a need for improvements in Statistical Natural Language Processing that overcomes the disadvantages of both the models that take the sequences of words into account and those that do no take the sequence of words into account.

The present invention has carefully considered the above problems and has provided the solution set forth herein.

SUMMARY OF THE INVENTION

A computer-implemented system and method is disclosed for retrieving documents using context-dependant probabilistic modeling of words and documents. The present invention uses multiple overlapping vectors to represent each document. Each vector is centered on each of the words in the document, and consists of the local environment, i.e., the word s that occur close to this word. The vectors are used to build probability models that are used for predictions. In one aspect of the invention a method of context-dependant probabilistic modeling of documents is provided wherein the text of one or more documents are input into the system, wherein each document includes human readable words. Context windows are then created around each word in each document. A statistical evaluation of the characteristics of each window is then generated, where the results of the statistical evaluation are not a function of the order of the appearance of words within each window. The statistical evaluation includes the counting of the occurrences of particular words and particular documents and the tabulation of the totals of the counts. The results of the statistical evaluation for each window are then combined. These results are then useful for retrieving a document, or extracting features from a document, or for finding a word within a document based on its resulting statistics.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3A and B show several equations used in constructing probabilistic models in accordance with the invention;

FIG. 4 is a flow chart of a process for the context-dependant probabilistic modeling of words and documents in accordance with one embodiment of the invention;

FIG. 5 shows the contents of two textual documents;

FIG. 6 shows an example of windows created around the words contained in the documents shown in FIG. 5; and FIGS. 7 and 8 show the counter results in accordance with one embodiment of the invention.

DETAILED DESCRIPTION OF THE PREFERRED EMBODIMENTS

1. Introduction

Figure 1:
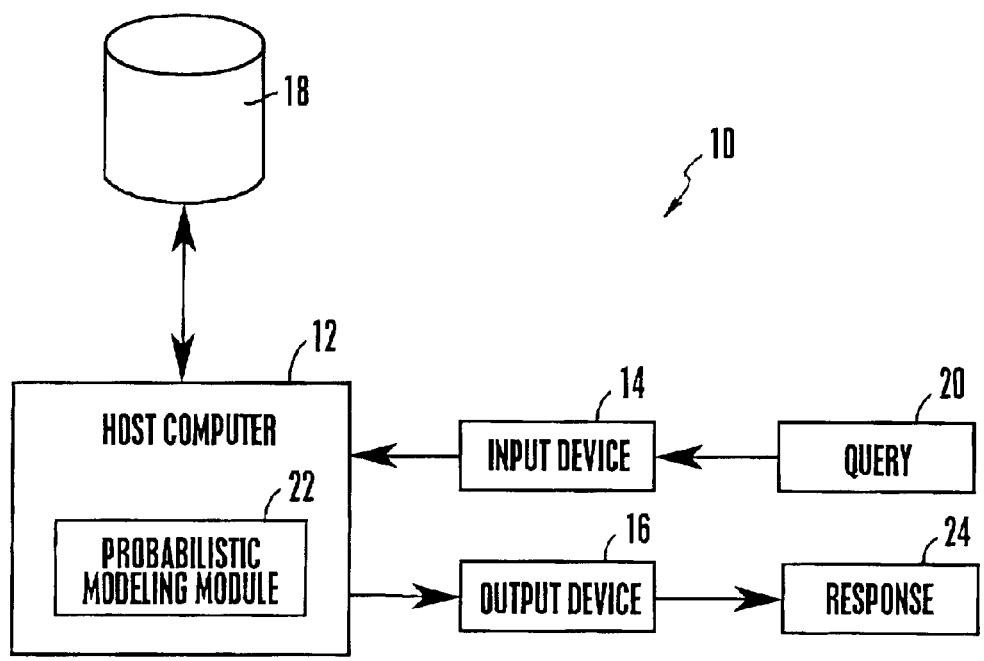
FIG. 1 is a block diagram of the architecture of the present system.

Referring initially to FIG. 1, a context-dependant probabilistic document modeling system is shown, generally designated 10, for storing and retrieving documents. As shown, the system 10 can include a computer 12 including a respective input device 14 such as a keyboard with, e.g., a point and click device, and an output device 16, such as a monitor, printer, other computer, or computer network. Also, the computer 12 accesses a database 18, which contains a large amount of textual data that a user desires to access. In particular, a user will input a query 22 for the computer 12 to find a particular kind of information in the database 18. In response, the computer 12, using a context-dependant probabilistic modeling module 22, will find the desired data and provide a response 24 to the user.

The computer 12 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as data storage devices.

Figure 2:
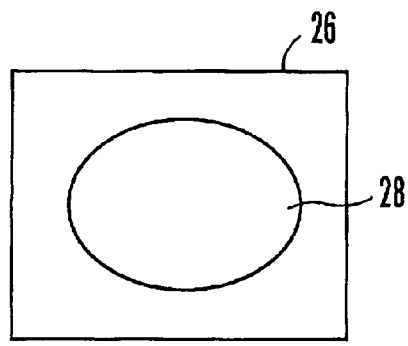
FIG. 2 is a schematic diagram of a computer program product.

In any case, the processor of the computer 12 accesses the context-dependant probabilistic document modeling module 22 to undertake the logic of the present invention, which may be executed by a processor as a series of computer-executable instructions. The instructions may be contained on a data storage device with a computer readable medium, such as a computer diskette 26 shown in FIG. 2 having a computer usable medium 28 with code elements. Or, the instructions may be stored on random access memory (RAM) of the computer 12, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow chart in FIG. 4 herein illustrates the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

In accordance with the invention multiple overlapping vectors are generated for each document of interest Each vector is centered on each of the words in the document. Thus each window consists of words that occur close to the particular word, its local environment. The vectors are called context windows. The size of the environment is determined when the model is built. The order of the words within a local vector is ignored to allow for variations in grammatical style.

Hence each document is represented as a collection of vectors. These vectors are used to build probability models that are used for prediction. Several models may be used to predict different output variables depending on the intended use of the system. In the preferred embodiment the occurrence, word and category membership are modeled for the text. The probabilistic model is Simple Bayes, but other probabilistic models may also be used.

Since probabilistic models can be used in many different ways, various attributes can be predicted from the vectors. The resulting representation can be used for information retrieval, finding related words, feature extraction, categorization, category description, etc. The vectors overlap and each of them will contribute what their local environment says about the entire document. The predictions are pooled so that one answer is provided for, e.g., text classification, feature extraction, finding related words, query expansion, text classification, and others.

2. Probability Models 2.1 Context Windows

The context windows are constructed by taking the words around each word in a document. This is the environment. A left and a right parameter are used to control the size of the window. In the example shown below, this window is symmetric and its size is plus and minus two words.

The order of the words within the window is ignored to allow for bad grammar (e.g. telephone transcripts) and varying writing styles. Duplicates are not removed. The word that the window is placed around is not included in the window in the preferred embodiment, but may be included for document and category models.

By using the window to predict document occurrences, the fact that NEAR and ADJACENT operators is often used to find relevant search results can be accommodated. For example, NEAR and ADJACENT operators are used in search engines such as Alta Vista by enclosing a phrase within quotes or connecting words with a dash.

The window also is useful when trying to predict the center word from the surrounding words. Many words have multiple meanings, but in one particular context they are often used in one single way. This is of concern is the area of word sense disambiguation.

2.2 Bayesian Models

The probabilistic models used with the present invention are conditional probabilities where the condition is given by words, or windows. Bayes=s Rule is described by equations (1) and (2) in FIG. 3, where d is the variable to be modeled and $O=o_1, Y, o_M$ is the environment. p(d) is the prior probability for variable d. Users=preferences can be encoded in this distribution, e.g., so that document or terms deemed more interesting will be favored as determined by prior usage of a retrieval system.

If a text (e.g., a document itself or a sentence) is used for input, context windows are created for the text. Each window is evaluated and the results are combined, preferably by averaging the probability assessments, but other combinations are possible. Since the result is normalized, input length is taken into account. If the input context is smaller than the window size the models can be used directly since the result is equivalent.

2.3 Models for Documents, Categories and Words

The models used in the present invention can be used to predict three things:

1. Document membership. The model is p(d¦O). The predicted variable d may or may not be appended with the specific context window number.

2. Document Category, p(t¦O). The specific context window may also be included here.

3. Word in the center of the environment. Model: p(c¦O), where O is the context window. These models will be examined individually.

The Document Model uses a document identifier that is modeled from the context window, p(d¦O). There are two uses for this model:

1. By evaluating $p(d|O)$ with any context and finding the document I.D., d, for which this quantity is maximized, this model can be used for document retrieval.

2. If, on the other hand the formula is reversed so that the conditional probability of a word given the document is evaluated, the model can be used for feature extraction. The words that have the largest $p(d|O)$ values are features relevant to a particular document, d.

It is useful to build a word list where all of these words are collected forming a list of content words for a document collection. This list can also be used to prune the model, as described below.

The Category Model models categories similarly to documents, except that there can be several categories per document. There are also two uses for this model:

1. Categorization is performed by evaluating arg max $p(t|O)$.

2. By evaluating the opposite, $p(o|t)$, it is possible to describe a category by finding words that are strongly associated with it.

The Word Model finds related words by evaluation of $p(c|O)$, where c is the predicted center word of the context window. The top related words describe the context in which a word occurs. This can be used for a definition of a word.

Due to the nature of language, a lot on non-content words will be predicted when such a model is used. In this situation it is better to use a list of features extracted for each document by the Document Model above. This list is constructed as described above. The list is then used so that only content words are evaluated.

There are other uses of the models in accordance with the invention. Summarization is done by first calculating the probability of each word in a document given the other words. The most informative words are found in this way. From there one can find the most informative sentences and paragraphs, etc. This is a way of creating summaries. Queries and query results can be combined to form summaries that answer a specific question.

Query Expansion can be done by adding words that are related but not mentioned. The expanded query can be used in a regular search engine. If the system is trained on a large enough vocabulary, it could be used for standard queries.

3. Implementing the Probability Models

To implement the probability models of the invention there are several possibilities to model a joint or conditional probability distribution. It is important to have a model that can be evaluated correctly even when input variables are missing. It is also important to have models that are efficient in the high dimensionalities that arise from the use of words as variables. Thus, Simple Bayes and Mixture Models are appropriate.

3.1 Simple Bayes

Since the number of possible combinations of O=s members are $2^{|o|}-1$ there is no way to sample them all in any type of text collection. This is why a model is used. The easiest model to use is Simple Bayes. There are several ways of defining Simple Bayes. Two ways are defined herein. They give rise to different formulations and it is useful to consider both. The first one is the Standard formulation, and the second one is defined in terms of Mutual Information.

The Simple Bayes assumption is unrealistic since words in an environment are in general not independent. Even though this is the case, these types of models work well in practice and can be viewed as an approximation that is often very useful.

3.2 Standard Simple Bayes

Simple Bayes makes the assumption that words are independent given the class variable, shown in equation (3), in FIG. 3. Combining equations (2) and (3) yields equation (4), also shown in FIG. 3. It is usually the case that $p(o_1,Y,o_M)$ is fixed when evaluating $p(d|o_1,Y,o_M)$ over all d. It then becomes a normalizing factor since $O^N_{i=1} p(d_i|o_1,Y,o_M)=1$. See equation (5) in FIG. 3.

To use this model is necessary to remember all $p(d)$ and all $p(o_i|d)$. Since $p(o_i|d)$ is defined as $p(o_i,d)/p(d)$ it is necessary to keep track of all pair-wise probabilities $p(o_i,d)$. The probabilities are estimated by counters, as described below. For computational reasons it is often useful to write this in logarithmic form, as shown in equation (6) in FIG. 3.

3.3 Mutual Information Simple Bayes

An alternate representation of Simple Bayes is sometimes used. Assume, in addition to equation (3), that also equation (7), shown in FIG. 3, is valid. The conditional probability can then be written as equation (8). $p(o_i|d)$ is then the same as $p(o_i,d)/p(o_i)p(d)$. Taking logarithms this is called Mutual Information, or sometimes Point-wise Mutual Information. It is defined between variables s and y as shown in equation (9) in FIG. 3. Defining $B_d=\log_2 p(d)$ it is possible to rewrite the logarithm of equation (2) as equation (10) shown in FIG. 3.

The conditional probability can thus be modeled as a sum of the pair-wise mutual information values. The B terms are bias values that are modified by the pair-wise correlations, as measured by Mutual Information. Mutual Information has been used for correlations such as word sense disambiguation.

Since it is known that Auninteresting@ combinations have values close to one, this fact can be used for pruning down the number of combinations that need to be stored. The most uninteresting combinations will be for common words such as Athe@, etc. The B-term is a Abias@ value that indicates how common a word is in the entire collection, the prior probability.

3.4 Pruning

The two Simple Bayes models both work by adding values to a bias. Some of the added values are small and can be removed or pruned from the model. A threshold is selected and all values below that threshold are removed for the standard case, or all pairs with an absolute value of the mutual information or logarithm of the conditional probability below a threshold are removed.

It has been found by using the present invention on actual databases that the actual number of useful pairs can be as low as 1/1000 of the possible pair combinations for center word prediction. A collection of 5,000 documents had approximately 39,000 unique words and about 1,000,000 pairs after mild pruning (at threshold 8), a reduction of 30% compared to keeping all combinations. This is a large number but quite manageable. The growth of the number of pairs is also largest in the beginning since local vocabularies are limited.

In general, it should only be necessary to prune the word prediction model since the other models do not grow to the same sizes. The pruning is done periodically as the pair-wise counters grow in numbers. It is possible to prune by monitoring how much memory is used. Since the pruning is done periodically, the number of pairs will go up and down. Some pairs that have disappeared can reappear at a later stage if their use is increased in later seen documents.

3.5 Probability Estimation

The Simple Bayes probability estimates are found through counts in accordance with the invention. Let $c_i$ be the number of times word i occurs and $c_{i,j}$ be the number of times the pair of i and j occur. There are N words in total. Then the relevant probabilities are as described in equations (11), (12), (13), and (14) in FIG. 3.

Some of the counts are going to be very small and thus quite unreliable. Equivalent Sample Size m-estimates of probability are used to add (m) unseen samples from a known distribution. In this case a uniform distribution over the number of unique output variables, U is used. The equations then become as shown in equations (15), (16), (17) and (18) in FIG. 3. This yields a very robust estimate.

3.6 Space Complexity

The number of counters, $c_x$ and $c_{x,y}$ that need to be stored can be calculated. The number of singular counters that are needed is the same as the number of unique output variables, i.e., the number of documents, categories or words. The number of pairs can be calculated by considering two factors. The first factor is the same as the singular count above. The second factor is based on the number of unique pair combinations in a window and with an output variable. This will be less than the number of unique words.

3.7 Mixture Models

Simple Bayes models are a bit crude but often work well. When they do not work well, other types of probability models may also be used with the techniques of the invention. The requirements of the probability model used are:

1) Evaluation (and training) must be possible if some or all input variables are missing.

2) The model must be able to handle very high dimensionalities, and

3) The model must be efficient in terms of time and space for both training, and more importantly, evaluation.

A Mixture Model is one probability model that meets these requirements. It is a method used in statistics that is similar to the Radial Basis Function (RBF) network used in the area of Machine Learning. Mixture Models are more expensive to learn compared to Simple Bayes but are made manageable by using the Expectation-Maximization (EM) algorithm. It is also possible to build the models using only a subset of the training data.

Mixture Models are a type of generative model where the data is assumed generated by a model. The parameters for the model are then chosen so that the likelihood of the data given the model is maximized. This is called Maximum Likelihood Estimation.

Similar vectors are grouped together to form clusters or mixtures. The clusters define probability distributions that are linearly combined. The clusters work as generators and it is assumed that each data point can be generated by a unique mixture. Mixture Models can be viewed as a Asoft@ form of classification, or a soft form of clustering, where each data point is allowed to be allocated to several clusters instead of just one. Each point thus has a probability distribution over the clusters. This allows for flexible and accurate models.

4. Implementations

FIG. 4 is a flow chart of a process for the context-dependant probabilistic modeling of words and documents in accordance with one embodiment of the invention. A text is first input into the document retrieving system 10 of the invention, as shown at block 30 in FIG. 4. A set of windows is generated around each word in the document, as indicated at block 32. A statistical evaluation of all the windows and documents is then performed, as shown in block 34. This will include collecting statistical counts of each element in the windows as well the each pair-wise counts, in the example shown in FIG. 5–7 and described below. The order of the words within each window is not considered, only the words themselves and the counts of the numbers of each word present. The center word within each window is not contained in the window and the window may be symmetric or asymmetric in size around the center word.

The results are then combined, as shown in block 36. An appropriate statistical model, such as Simple Bayes, is then generated and applied to the combined results, as shown blocks 38 and 40. The final results are then calculated based on the counts, as indicated in block 42. For example, the results may be statistical information that is used to retrieve a document, extract features from a document or find the center word in a window.

A specific example of the use of the context-dependant probabilistic modeling techniques of the present invention is illustrated in FIGS. 5–7. FIG. 5 shows an example of two documents, Document 1 and Document 2, which each contain five words. The task of the model is to associate the windows with the documents. This model is useful for document retrieval and feature extraction. In this case the specific context window membership is not modeled to simplify the presentation.

Overlapping windows are created around each word in the documents. In this example, the window size is minus 2 words to plus 2 words around each word. The windows are shown in FIG. 6. Statistics about singular word occurrences and pairs are then collected. In particular, for each window and variable (in this case the variable is the document number): 1) statistics are collected for each variable; and 2) pair-wise statistics are collected for variables and each element in the window.

FIG. 7 shows the statistics collected for each variable. For the first variable, document 1, the single counter finds 5 words in the document. Likewise, for the second document the single counter finds 5 words in the document. For the word Athe@, the counters find that the word appears seven times in the windows. Likewise, the word Aquick@ appears 3 times in the windows. This counting process is repeated for each other word.

As shown in FIG. 7 the pair-wise counter finds that the pair A1-the@ appears three times. In other words, the word Athe@ appears three times in the document 1 windows. Likewise, the word Aquick@ appears three times in the document 1 windows. This process is repeated for each pair-wise combination of words within the windows and document numbers.

Using the results from the counters shown in FIGS. 7 and 8, the probabilities for any document can be estimated given a number of words, i.e. p(d¦w_1,Yw_n). The equations for this are given in FIG. 3. In particular, probabilities are estimated by dividing by N,p(x)=C(x)/N, where C(x) is the number of times x occurs. For example, p(fox)=3/28=0.1071. Better estimates for probability are possible using the equations in FIG. 3. In this case, p(fox) would be estimated by (3+1)/(28+11)=0.1026.

Conditional probabilities p(x¦y) are estimated by C(x,y)/C(x). Hence, p(brown¦1) is C(1,brown)/C(1). For example, p(1¦brown) is the probability of seeing document 1 if the word seen is brown. Thus p(1)+p(brown¦1)/p(brown)=5/28+3/5/3=0.38. Similarly, for document 2: p(2¦brown)=5/28+0/3/5=0.18. Since this model is an approximation, the values don=t sum to 1. Normalization is done so that p(1¦brown)+ p(2¦brown)=1. Hence, it is more likely that the document is 1 than 2 if the word is brown.

In order to speed up retrieval of documents and related words in the system a specific database format can be used. To find the conditional probabilities of a word that is related to some other words, e.g., a query, the words that are related to the query words must be known using the probability model. A list of the words that are related to each other word are stored in the same record. When a word is retrieved from the database then all of its relatives are retrieved.

These are the pairs that arise from Equation 8 and 10. Since the B and M values in Equation 10 must be known, these values are stored next to a reference to each word in the database record. In the case of the document retrieval model, this amounts to storing the document identifiers that are related to each word.

For example, using the documents in FIG. 5. The following database records are created:

| Key | Record |
|---|---|
| the | B(the), D1, M(the,D1), D2, M(the,D2) |
| quick | B(quick), D1, M(quick,D1) |

B(the) is the bias value for the word "the". M(the,D1) is the mutual information value for "the" and document D1.

The values for B and M are logarithms and have a limited range, for example from 5 to 19. They are floating point number but it is not necessary to store the fractional part. Therefore only the integer part of these numbers is stored after each number has been round to its nearest integer value. This method yields very good results and results in a significantly reduced storage space. The range of B and M is dependent on the actual document collection. A number that has a range from 5 to 19 can be stored using 5 bits in this format compared to 64 bits as a regular floating point number.

The same storage method can be used for the model for related words.

While the particular SYSTEM AND METHOD FOR CONTEXT-DEPENDENT PROBABILISTIC MODELING OF WORDS AND DOCUMENTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or "steps for".

What is claimed is:

1. A computer-implemented method for retrieving documents comprising:
   inputting the text of one or more documents, wherein each document includes human readable words;
   creating context windows around each said word in each document;
   generating a statistical evaluation of the characteristics of all of the windows, wherein the results are not a function of the order of the appearance of words within each window; and
   combining the results of the statistical evaluation for each window.

2. The method according to claim 1 further comprising:
   determining the likelihood of documents having predetermined characteristics based on the combined statistical evaluation for each window.

3. The method according to claim 2 further comprising:
   assigning a document identifier to each document and context window position; and
   determining the document identifier of at least one document having said predetermined characteristics.

4. The method according to claim 1 further comprising:
   defining a plurality of document categories; and
   determining the category of a particular document based on the combined statistical evaluation for each window.

5. The method according to claim 1 further comprising:
   determining the word that is in the center of a particular window based on the combined statistical evaluation for each window.

6. The method according to claim 1 wherein the step of generating a statistical evaluation further includes counting the occurrences of particular words and particular documents and tabulating totals of the counts.

7. The method according to claim 6 wherein the step of generating a statistical evaluation further includes the step of generating counts about singular word occurrences and about pair-wise occurrences.

8. The method according to claim 7 further comprising the step of pruning the number of pair-wise counts.

9. The method according to claim 8 wherein the step of pruning further includes the steps of monitoring the amount of memory used for the pair-wise counts and pruning when a predetermined threshold of memory has been exceeded for the pair-wise counts.

10. The method according to claim 6 wherein the step of generating a statistical evaluation further includes the step of determining probabilities of particular words appearing in particular documents based on the counts.

11. The method according to claim 10 wherein the step of generating a statistical evaluation further includes determining conditional probabilities of particular words appearing in particular documents based on the counts.

12. The method according to claim 11 further comprising the step of calculating a conditional probability based on a Simple Bayes statistical model.

13. The method according to claim 1 wherein the step of creating context windows around each word further comprises the step of selecting the words appearing before and after each word by a predetermined amount in the document and including those selected words in the window.

14. The method according to claim 13 wherein the word around which each window is created is not included in the window.

15. The method according to claim 1 further comprising normalizing the combined results of the statistical evaluation for the windows.

16. The method according to claim 1 wherein the step of evaluating further comprises, determining a measure of mutual information.

17. The method according to claim 1 wherein the step of combining includes averaging probability assessments.

18. A computer system comprising:
    storage unit for receiving and storing a plurality of documents, wherein each document includes human readable words; means for creating context windows around each said word in each document;
    means for generating a statistical evaluation of the content of each window, wherein the order of the appearance of words within each window is not used in the statistical evaluation;
    means for combining the results of the statistical evaluation for each window; and
    means for determining the probabilities of documents having predetermined characteristics based on the combined statistical evaluation for each window.

19. The computer system according to claim 18 further comprising:
    a document identifier assigned to each document; and
    means for determining the document identifier of at least one document having said predetermined characteristics.

20. The computer system according to claim 18 further comprising:
    a plurality of document categories; and
    means for determining the category of a particular document based on the combined statistical evaluation for each window.

21. The computer system according to claim 18 further comprising:
    means for determining the word that is in the center of a particular window based on the combined statistical evaluation for each window.

22. The computer system according to claim 18 wherein the step of generating a statistical evaluation further includes counting the occurrences of particular words and particular documents and tabulating totals of the counts.

23. The computer system according to claim 22 wherein the means for generating a statistical evaluation further includes means for determining probabilities of particular words appearing in particular documents based on the counts.

24. The computer system according to claim 23 wherein the means for generating a statistical evaluation further includes means for determining conditional probabilities of particular words appearing in particular documents based on the counts.

25. The computer system according to claim 18 wherein the means for creating context windows around each word further comprises means for selecting the words appearing before and after each word by a predetermined amount in the document and including those selected words in the window.

26. A computer program product comprising:
    a computer program storage device;
    computer-readable instructions on the storage device for causing a computer to undertake method acts to facilitate retrieving documents, the method acts comprising:
    inputting the text of one or more documents, wherein each document includes human readable words;
    creating context windows around each said word in each document;
    generating a statistical evaluation of the characteristics of each window, wherein the results are not a function of the order of the appearance of words within each window; and
    combining the results of the statistical evaluation for each window.

27. The computer program product according to claim 26 further comprising:
    determining the likelihood of documents having predetermined characteristics based on the combined statistical evaluation for each window.

* * * * *